Jan. 16, 1968   G. F. HANKS   3,364,286
METHOD FOR DAMPING THE STACK OF A GLASS MELTING FURNACE
Filed April 1, 1965
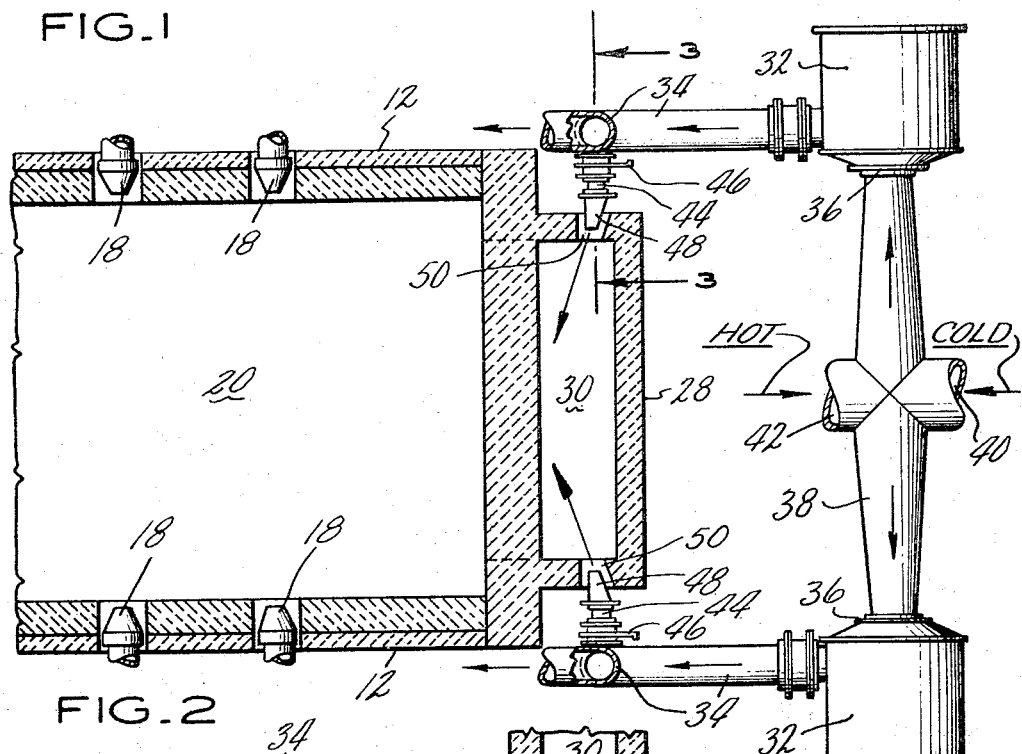
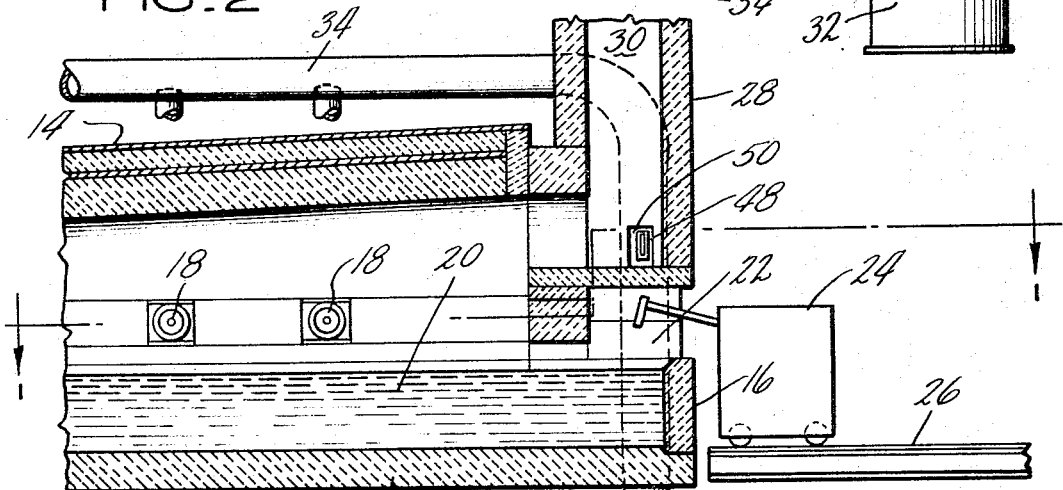
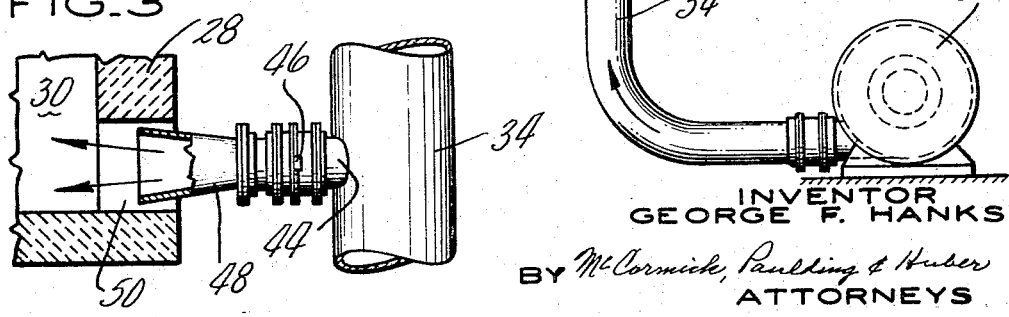
INVENTOR
GEORGE F. HANKS
BY McCormick, Paulding & Huber
ATTORNEYS United States Patent Office 3,364,286
Patented Jan. 16, 1968

3,364,286
METHOD FOR DAMPING THE STACK OF A
GLASS MELTING FURNACE
George F. Hanks, Avon, Conn., assignor to Emhart
Corporation, Bloomfield, Conn., a corporation of
Connecticut
Filed Apr. 1, 1965, Ser. No. 444,669
3 Claims. (Cl. 263—52)

ABSTRACT OF THE DISCLOSURE

A closed glass melting furnace having air and fuel combustion nozzles and a stack for the waste products of combustion wherein air is impelled under pressure in conduits to the combustion nozzles and wherein a portion of the air is diverted from the said conduits to the bottom of the stack to provide a damper for controlling pressure in the combustion chamber.

---

This invention relates to improvements in a glass melting furnace, the improvements residing particularly in a new method and system for controlling pressure within the furnace by damping the exhaust stack for the waste products of combustion.

It is the general object of the invention to provide a simple and foolproof method for controlling the pressure within a glass melting furnace so that a desired pressure level can easily be maintained for efficient combustion whether the furnace burners are being operated near peak capacity or at a much lower rate.

Another object of the invention is to provide an improved method of handling the supply of combustion air and for damping the exhaust stack for a glass melting furnace so that the air supply load and the load on the stack will be more nearly constant than has heretofore usually been the case.

Glass melting furnaces or "unit melters" of the type to which the present invention may be applied are usually provided in elongated rectangular configuration. Such furnaces are covered or provided with a closed top, but they have a stack projecting upwardly, generally at one end of the furnace, to exhaust the waste products or gases of combustion. A row of spaced apart burners are provided along each side of the furnace to direct a combustion mixture of fuel and air over a body of molten glass in the furnace.

The stack opening must be quite large in order to accommodate the waste gases of combustion when all of the burners are operating at maximum capacity without causing too much gas pressure in the furnace. This large opening is cause for concern, however, when the burners are being operated at substantially less than their rated capacity. That is, under such circumstances insufficient pressure is maintained within the furnace for efficient combustion and distribution of heat to the molten body of glass. Therefore, it is highly desirable to provide a means for damping the stack during low rate combustion, but mechanical dampers have not proven satisfactory. The high temperature of the exhaust gases affects the mechanical dampers deleteriously and they have but a short useful life.

In accordance with the present invention, the stack is damped by the use of air. That is, air under pressure is introduced to the opening at the bottom of the stack during periods of low rate combustion in order to maintain a desirable stack load and thereby to create a desirable back pressure or pressure within the furnace. It is an important feature of the present invention that the damping air for the stack is supplied from the source of pressurized air supplying the burners. As a result, when a reduced supply of air is needed for the burners, more of it is used in damping the stack and vice versa. As a result, the load on the combustion air supply system remains more nearly constant, the exhaust load on the stack remains more nearly constant, and the pressure within the furnace remains more nearly constant and at a selected or desired level.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 1 is a horizontal cross sectional view taken at the stack end of a furnace incorporating the air handling system and devices of the present invention, the view being taken as indicated generally by the line 1—1 of FIG. 2.

FIG. 2 is a vertical cross sectional view of the said end of the furnace.

FIG. 3 is a detail vertical cross sectional view showing an air damper which features the present invention.

As has been said, a glass melting furnace or "unit melter" is generally provided in elongated rectangular shape. One end portion of such a furnace is shown in the drawings as including a bottom wall 10, side walls 12, 12 and a top wall 14, all of which are constructed of heat resistant refractory material. The furnace end wall 16 shown in the drawings is also made of a refractory material as is the opposite end wall (not shown). A plurality of burners 18, 18 are spaced along each side wall 12 to direct a burning mixture of fuel and air into the furnace over a body of molten glass 20 which is heated and maintained in the molten condition by the said burners.

The glass making ingredients or constituents of glass are introduced to the furnace through what is known as a "doghouse" 22 located in the end wall 16. The said doghouse comprises a projection of the end wall open at the top to receive the constituents or glass batch from a batch feeding or charging device 24 of conventional construction. The batch charger 24 can be moved toward and away from the end of the furnace over rails 26, and when it is located adjacent the furnace and is placed in operation, it feeds batches of the glass making constituents at regular intervals. The molten glass flows through an opening in the opposite end wall of the furnace generally into a forehearth from which it is fed in a molten or globual state to a glass forming machine.

A relatively large stack 28 is provided at the shown end of the furnace to project upwardly from the top wall 14, the said stack being located over the doghouse 22. The stack opening 30 is quite large and it communicates with the interior of the furnace 10 to carry away the waste or exhaust gases of combustion when all of the burners 18, 18 are operating at maximum capacity without causing an undesirably high back pressure or pressure within the furnace. It is this stack opening 30 which must be partially closed or damped when the burners are operating at a relatively low rate in order that the pressure within the furnace will not be too low for efficient combustion and heat transfer to the molten glass.

The stack damping and air supply and handling system for the furnace includes an air impeller 32 and a burner conduit 34 for each side of the furnace, the conduit 34 being connected to the outlet of the associated impeller 32 and also being connected to each of the burners 18, 18 on the nearest side of the furnace so as to supply air thereto for mixture with fuel. Each impeller 32 has an inlet 36, and an inlet conduit 38 is connected between the inlets of the respective impellers. At its midpoint, the conduit 38 is provided with a cold air opening 40 and a hot air opening 42. The cold air opening or inlet 40 is opened to air at ambient temperature. The hot air opening 42 preferably is provided with an open end conduit which extends beneath the furnace to draw in air which is quite hot due to its proximity to the furnace. The suitable valve or damper (not shown) can be provided for either or both of the openings 40 and 42 to control the temperature of the air being introduced to the impellers 32, 32. It is desirable to provide this air at an elevated temperature so that the air reaching the combustion nozzles or burners 18, 18 is preheated.

The impellers 32, 32 can be driven by conventional motor means (not shown) so as to be operated simultaneously or independently and they are designed to supply air to the burners at a selected or desired pressure. A portion of this pressurized air in each burner conduit 34 is diverted to the stack 28 for use there whenever damping is needed. This air is diverted through a short conduit 44 having a damper 46 therein and having a nozzle 48 at its end which projects into an opening 50 through the wall of the stack 28 into the bottom portion of the stack opening 30.

As will be observed in FIG. 1, the nozzles 48, 48 and the nozzle openings 50, 50 are located on opposite sides of the stack 28, and the nozzles 48 are designed to direct the diverted air into the stack opening 30 as indicated by the arrows associated therewith. This air which is admitted to the bottom of the stack opening 30 under pressure tends to load the stack and thereby to reduce the effective size of the opening 30 so far as its ability to exhaust the gaseous waste products of combustion from the interior of the furnace. In other words, the diverted air creates a back pressure whereby to provide a control of the pressure within the furnace.

The diverted air may be used for the aforedescribed purposes only occasionally. That is, when the burners 18, 18 are being used at peak capacity, the waste gases of combustion will tend to load the stack opening 30 and to cause sufficient back pressure or pressure within the furnace to assure efficient combustion. However, during periods when the burners are being operated at less than peak capacity, the stack opening 30 is much larger than is really needed to handle the exhaust gases with the result that the pressure within the furnace may be less than desirable for efficient combustion. It is under these circumstances that the nozzle valves or dampers 46, 46 are opened to divert air into the bottom of the stack to effect a damping thereof. In practical installations, it has been found desirable to provide such air damping when the burners are being operated at sixty percent (60%) or less of their peak capacity.

While a conventional manually operated damper 46 has been shown for each of the diverting conduits 44, 44, it will be readily understood that the dampers could be operated by power, controlled automatically. That is, power operating means can be employed for the diverting air conduits which will open the diverting air valves whenever the fuel valves for the burners 18, 18 are closed.

The aforedescribed method and means for damping the stack 28, whereby the advantage of pressure control within the furnace is obtained, also provides an advantage in that a more constant load is imposed upon the air impellers 32, 32. Thus, the entire air handling system can be operated at greater efficiency.

The invention claimed is:

1. A method of controlling pressure on a body of molten glass in a glass melting furnace of the type having a closed top and a stack and burners directing a combustion mixture of fuel and air over the body of glass, said method comprising the steps of impelling a generally constant volume of air under pressure in a stream to the burners for mixture with fuel, diverting some air from the stream to the bottom of the stack for mixture with the waste products of combustion, and controlling the flow of diverted air in relationship to the air used in combustion so as to increase the amount of diverted air when combustion and the products thereof are low and to decrease the amount of diverted air when combustion and the products thereof are high.

2. A method of controlling pressure on a body of molten glass in a glass melting furnace of the type which is generally rectangular, has a closed top, a stack at one end and burners along each side which direct a combustion mixture of fuel and air over the body of glass, said method comprising the steps of impelling a generally constant volume of air under pressure in a stream at each side of the furnace to the burners for mixture with fuel, diverting some air from each stream to the bottom of the stack at the adjacent side thereof for mixture with the waste products of combustion therein, and controlling the flow of diverted air in relationship to the air used in combustion so as to increase the amount of diverted air when combustion and the products thereof are low and to decrease the amount of diverted air when combustion and the products thereof are high.

3. The method of controlling pressure as set forth in claim 2 including an initial step of drawing heated air from adjacent the furnace to provide at least a portion of the supply for the impelled air streams.

References Cited

UNITED STATES PATENTS

| | | | |
|---|---|---|---|
| 2,158,095 | 5/1939 | Vierow | 263—15 |
| 2,288,491 | 6/1942 | Seil | 263—15 |
| 2,979,322 | 4/1961 | Dailey | 263—40 |

FREDERICK L. MATTESON, JR., *Primary Examiner.*

D. A. TAMBURRO, J. J. CAMBY, *Assistant Examiners.*